United States Patent [19]

Murakami et al.

[11] Patent Number: 5,962,677

[45] Date of Patent: *Oct. 5, 1999

[54] CELLULOSE ACETATE WITH HIGH MOLDABILITY AND PROCESS FOR PRODUCTION THEREOF

[75] Inventors: Ko Murakami; Toshinori Okano; Hiroki Taniguchi; Atsunobu Kiyose; Shu Shimamoto, all of Hyogo, Japan

[73] Assignees: Daicel Chemical Industries, LTD., Osaka; Fuji Photo Film Co., LTD., Minamiashigara, both of Japan

[ * ] Notice: This patent is subject to a terminal disclaimer.

[21] Appl. No.: 09/169,473

[22] Filed: Oct. 9, 1998

Related U.S. Application Data

[63] Continuation of application No. 08/750,183, filed as application No. PCT/JP96/00862, Mar. 29, 1996.

[30] Foreign Application Priority Data

Mar. 31, 1995 [JP] Japan ................................ 7-100711
Apr. 11, 1995 [JP] Japan ................................ 7-85550

[51] Int. Cl.⁶ .................................................... C08B 3/06
[52] U.S. Cl. ................ 536/69; 536/70; 536/71; 536/76; 536/80
[58] Field of Search ............................. 536/69, 70, 71, 536/76, 80

[56] References Cited

U.S. PATENT DOCUMENTS

| | | | |
|---|---|---|---|
| 4,024,334 | 5/1977 | Chandler et al. | 536/65 |
| 4,162,359 | 7/1979 | Leithem et al. | 536/70 |
| 4,269,972 | 5/1981 | Yabune et al. | 536/71 |
| 4,306,060 | 12/1981 | Ikemoto | 536/69 |
| 4,312,980 | 1/1982 | Motozato et al. | 536/76 |
| 4,499,043 | 2/1985 | Yabe et al. | 264/207 |
| 4,501,886 | 2/1985 | O'Brien | 536/57 |
| 4,551,389 | 11/1985 | Ohtake et al. | 428/402 |
| 4,697,007 | 9/1987 | Seitz et al. | 536/83 |
| 4,888,420 | 12/1989 | Steiner et al. | 536/64 |
| 4,983,730 | 1/1991 | Domeshek et al. | 536/69 |
| 5,047,180 | 9/1991 | Steiner et al. | 264/5 |
| 5,114,535 | 5/1992 | Burley et al. | 162/9 |
| 5,142,034 | 8/1992 | Bellas et al. | 536/58 |
| 5,244,945 | 9/1993 | Elion | 524/10 |
| 5,288,318 | 2/1994 | Mayer et al. | 106/126.3 |
| 5,371,207 | 12/1994 | Zuang | 536/58 |
| 5,449,555 | 9/1995 | Karstens et al. | 428/364 |
| 5,478,386 | 12/1995 | Itoh et al. | 428/532 |
| 5,597,912 | 1/1997 | Edgar et al. | 536/63 |
| 5,608,050 | 3/1997 | Kuo et al. | 536/70 |

*Primary Examiner*—Howard C. Lee
*Attorney, Agent, or Firm*—Flynn, Thiel, Boutell & Tanis, P.C.

[57] ABSTRACT

Cellulose acetate having a high moldability and low solution viscosity in spite of having a high average degree of polymerization is obtained. The low molecular weight components of cellulose acetate (e.g., CTA having average degree of acetylation of 59.0 to 62.5%) are eluted with a washing solvent to produce a cellulose acetate having a molecular weight distribution Mw/Mn of 1 to 1.7. As the washing solvent, those swell or partially dissolve the cellulose acetate, for example, those which dissolve 0.1 to 30% by weight of cellulose acetate can be used. This solvent includes, for example, a solvent having a solubility parameter δ of 7 to 12.5 (ketones, ethers, organic acid, esters, etc.).

7 Claims, 1 Drawing Sheet

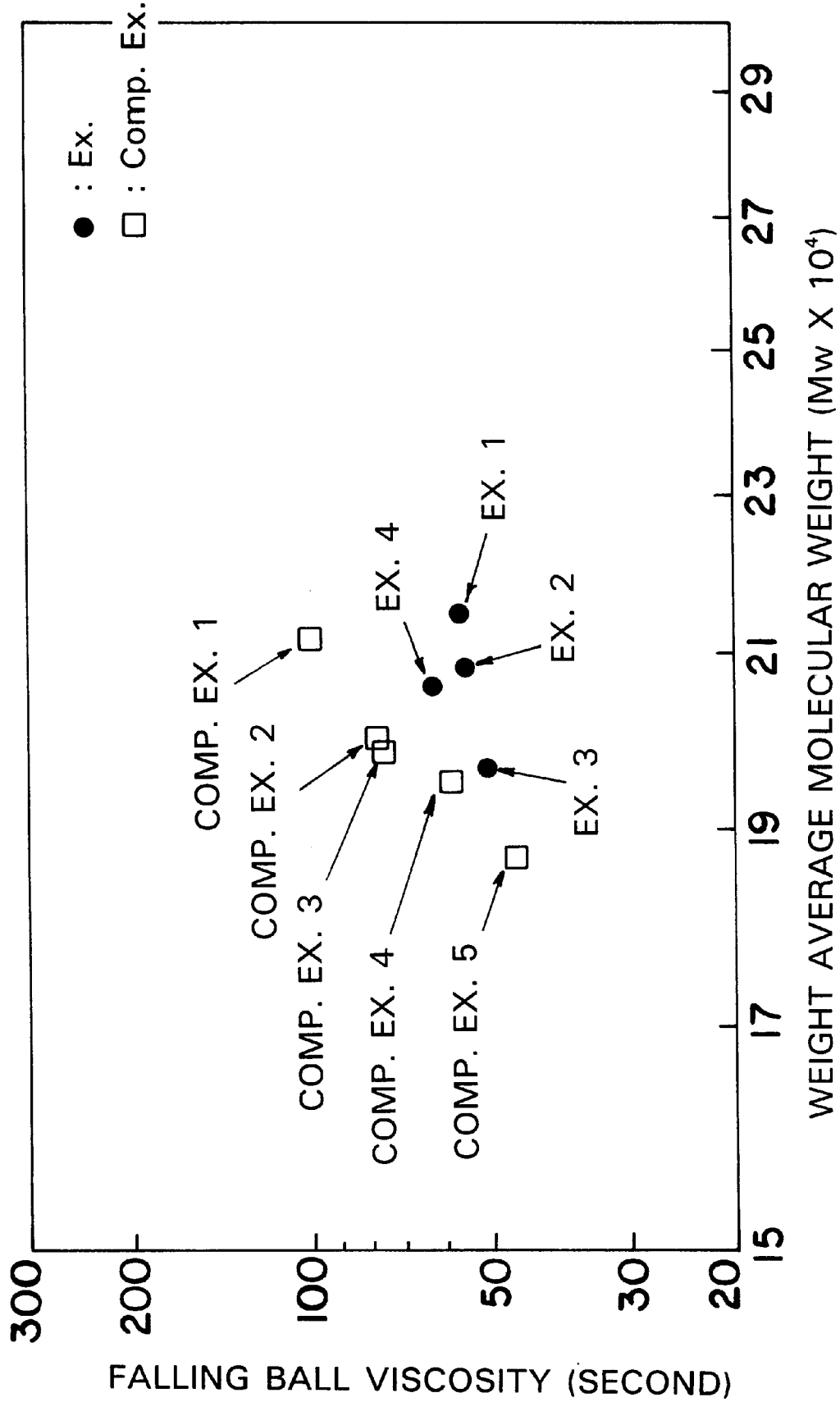

CELLULOSE ACETATE WITH HIGH MOLDABILITY AND PROCESS FOR PRODUCTION THEREOF

This is a continuation of Ser. No. 08/750,183, filed Nov. 21, 1996, which is a 371 of PCT/JP96/00862, filed Mar. 29, 1996.

FIELD OF THE INVENTION

The present invention relates to cellulose acetate, particularly cellulose triacetate, which is highly moldable to a film and the like, and to a process for the production thereof.

BACKGROUND ART

Generally, cellulose acetate is a semi-synthetic polymer obtained from cellulose as a starting material, by esterification with acetic anhydride. Currently, commercially available cellulose acetate can be roughly divided into two groups according to its degree of acetylation. One is cellulose triacetate (hereinafter referred to as CTA) having a degree of acetylation not less than 59%, and the other is cellulose diacetate, which ranges widely, and that with a degree of acetylation of about 50 to 59% is referred to as cellulose diacetate (CDA). In other words, it is cellulose acetate soluble in acetone.

Cellulose acetate, especially CTA, which has excellent physical properties, particularly good processability and high optical properties, has been utilized for many years in the field of plastics, fibers and films (for example, photographic film, etc.). Further, cellulose acetate has attracted attention from the viewpoint of the global environment, because it possesses a biodegradability and the like.

A molded product of cellulose acetate, such as CTA, can be prepared generally by the fluidization of a solution of cellulose acetate dissolved in a solvent to a desired form, followed by removal of the solvent, for example, by evaporation (see, for example, JP-B 45-9074, JP-B 49-4554, JP-B 49-5614).

On the other hand, as the uses of cellulose acetate increase, speeding up of its processing is required and high speed molding, high speed spinning and high speed processing of the molded product have been tried. For example, in a process for producing a film, it is proposed to cast a solution of cellulose acetate at a high speed to be molded into a film. In order to improve the moldability corresponding to such speeding up, it is proposed to reduce the viscosity of a concentrated solution of cellulose acetate. In order to reduce the viscosity of such a concentrated solution, in general, the average degree of polymerization of the cellulose acetate has been reduced. However, when cellulose acetate with a low average degree of polymerization is used, the mechanical strength of the molded product will be impaired ("Effect of the degree of polymerization of CTA on the physico-mechanical properties of thread", Krim Volokna, 1985, No. 3, p. 46–47, etc.). Particularly, it is difficult to reduce the solution viscosity for cellulose acetate with a high degree of acetylation, especially CTA, while retaining a high degree of polymerization.

Further, a molded product of cellulose acetate is generally rigid and brittle, and these properties become more remarkable as the acetylation degree increases. The physical properties of certain polymeric material greatly depend on its crystallizability. That is, those having a high crystallizability are imparted with strength while flexibility, for example, elongation is impaired, resulting in a brittle product. Of course, CTA is not an exception, and has a high crystallizability due to its homogeneous structure. That is, for a cellulose acetate, the higher the degree of acetylation becomes, the higher the crystallizability will be. Moreover, crystals are generally formed because lower molecular weight materials act as nuclei. Accordingly, when CTA or CDA is used, the molded product is generally imparted with a flexibility by adding a plasticizer. For example, phthalate plasticizers, such as diethyl phthalate, may often be used for acetate plastics used as a grip of a screwdriver or the like. In addition, a cellulose acetate, particularly CTA, has a utility as a raw material for various films due to its excellent transparency. However, it has defects, for example, the film is rigid and brittle. To overcome these physical defects, a plasticizer is also used in this case. Adding ingredients such as a plasticizer is accompanied, not only with a decreased yield of the final product due to bleedout during molding, but also with economical disadvantages. Thus, the development of materials for producing a film having excellent physical properties while maintaining the characteristics of CTA by addition of a small amount of a plasticizer has been expected.

Accordingly, an object of the present invention is to provide a cellulose acetate having a low solution viscosity and excellent moldability, in spite of its high molecular weight and degree of polymerization.

Another object of the present invention is to provide a cellulose acetate having a high solubility in a solvent and high moldability, in spite of having a high average molecular weight and high average degree of substitution.

Still another object of the present invention is to provide a cellulose acetate useful in producing molded products having a high moisture resistance and dimensional accuracy by a molding process at a high processing speed using a solution of a cellulose acetate having a low solution viscosity.

Still another object of the present invention is to provide a process for producing a cellulose acetate having the excellent properties described above.

DISCLOSURE OF THE INVENTION

The present inventors have studied intensively to attain the above objects. As a result, we have found that:

(1) treatment of a cellulose acetate, such as CTA, with a solvent to elute components having a low molecular weight, results in a narrow range of Mw/Mn, which is an index of the distribution of the molecular weight of the cellulose acetate;

(2) removal of the low molecular weight components results in significantly reduced viscosity of the concentrated solution within a certain range of Mw/Mn, in spite of having a high molecular weight, thereby improving the moldability;

(3) reduction of the crystallizability of the material, that is, removal of low molecular weight materials which serve as seeds in the formation of crystals, results in improved physical properties, particularly the film strength of the molded product and improved flexibility, and the present invention has been completed on the basis of such findings.

That is, cellulose acetate of the present invention has a molecular weight distribution Mw/Mn of 1 to 1.7, according to gel permeation chromatography, and is highly moldable. This cellulose acetate includes, for example, cellulose acetate having an average degree of acetylation of 52 to 62.5%, molecular weight distribution Mw/Mn of about 1.2 to 1.7, cellulose acetate comprising an acetone extract of less than 5%, with a viscosity average degree of polymerization (DP) of not less than 290, and the concentrated solution viscosity (η), according to the falling ball viscosity method for viscosity average degree of polymerization (DP), is expressed by the following formula (1):

$$2.814 \times ln(DP) - 11.753 \leq ln(\eta) \leq 7.28 \times ln(DP) - 37.059, \quad (1)$$

particularly, CTA.

This cellulose acetate can be obtained by washing cellulose acetate with a solvent and eluting low molecular weight components of the cellulose acetate. Washing solvents include solvents that swell or particularly dissolve cellulose acetate, for example, those which dissolve 0.1 to 30% by weight of the cellulose acetate when the cellulose acetate is dispersed at the temperature of 25° C. and a solids concentration of 5% by weight. Examples of the washing solvent include, for example, ketones, ethers, organic acids and esters. Most of these solvents have a solubility parameter δ of about 7 to 12.5. The present invention also encompasses the following aspects.

The present invention includes cellulose acetate wherein the average degree of acetylation is not less than 59%, acetone extract is not more than 5%, and concentrated solution viscosity (η) for viscosity average degree of polymerization (DP) according to the falling ball viscosity test is expressed by the following formula (2):

$$2.814 \times ln(DP) - 11.753 \leq ln(\eta) \leq 6.29 \times ln(DP) - 31.469 \quad (2)$$

(wherein, DP is a positive integer of not less than 290).

Further, the present invention includes a process for producing a cellulose acetate which is characterized by having an average degree of acetylation of not less than 59%, acetone extract of not more than 5% and concentrated solution viscosity (η) for viscosity average degree of polymerization (DP) according to the falling ball viscosity test expressed by the following formula (2):

$$2.814 \times ln(DP) - 11.753 \leq ln(\eta) \leq 6.29 \times ln(DP) - 31.469 \quad (2)$$

(wherein, DP is a positive integer of not less than 290), which comprises washing the cellulose acetate obtained according to an ordinary method with one or more solvents selected from ketones, acetate esters and cellosolves.

Preferred cellulose acetates contain not less than 70% of those having a particle size of 20 mesh path.

The present invention will now be explained in detail.

A cellulose acetate is preferably an acetate ester of (cellulose acetate), however, it may include mixed acid esters of other organic acids, for example, an ester of an aliphatic organic acid having about 3 or 4 carbon atoms (e.g., cellulose acetate propionate, cellulose acetate butyrate), cellulose acetate phthalate, etc.; mixed acid esters of inorganic acids (e.g., cellulose acetate nitrate), so long as it contains an acetate ester as a main ingredient.

Cellulose acetate of the present invention is characterized by having a narrow molecular weight distribution Mw/Mn (Mw: weight-average molecular weight; Mn: number-average molecular weight) according to gel permeation chromatography. That is, the Mw/Mn of cellulose acetate of the present invention is 1 to 1.7 (e.g., 1.2 to 1.7), preferably, 1.3 to 1.65, more preferably, about 1.4 to 1.65, and is often about 1.3 to 1.6. When the molecular weight distribution Mw/Mn exceeds the above maximum value, the viscosity of the cellulose acetate solution increases and the moldability by casting and the like (particularly, the moldability at high speed) is impaired. When the lower limit of the Mw/Mn becomes closer to 1.0, the solution viscosity decreases but the strength of the molded product is impaired. Accordingly, the Mw/Mn is preferably more than 1.

The weight-average molecular weight of cellulose acetate is not particularly limited and selected according to the application. For example, it is $1 \times 10^4$ to $100 \times 10^4$, preferably, $5 \times 10^4$ to $75 \times 10^4$, more preferably, about $10 \times 10^4$ to $50 \times 10^4$.

Further, the cellulose acetate of the present invention has a low concentrated solution viscosity in spite of having a high molecular weight and degree of polymerization relative to ordinary cellulose acetates because the low molecular weight components are removed. Although the reason for this is not clear, it is considered that the higher molecular weight materials control the apparent viscosity in a high molecular weight solution. In the present invention, it is assumed that the amount of the high molecular weight materials does not change while the average molecular weight becomes higher. Accordingly, the average degree of polymerization of the cellulose acetate can be selected within the range so as not to impair the mechanical properties and the like of the molded products. The viscosity-average degree of polymerization (DP) of cellulose acetate (especially, CTA) is, for example, preferably not less than 290 (e.g., 290 to 400), more preferably, about 250 to 350 (e.g. 300 to 350). For a cellulose acetate having a viscosity-average degree of polymerization of less than 100, the mechanical properties of the molded product is likely to be impaired.

The degree of acetylation of the cellulose acetate (percentage of the bonded acetate) can be selected from the range of from 52 to 62.5%. The preferred degree of acetylation of the cellulose acetate is not less than 59% (e.g., 59.0 to 62.5%), particularly 59 to 62% (e.g., 60 to 61.5%). When the degree of acetylation is low, the hygroscopicity is likely to increase and dimensional stability is likely to be impaired. Accordingly, particularly preferred cellulose acetates include those having a high degree of acetylation, for example, CDA and CTA, particularly, CTA.

Among such cellulose acetates, CTA having the following properties has a high moldability, because it has a high solubility in a solvent and its solution viscosity can be reduced in spite of having a high hygroscopicity and dimensional stability, as well as a high degree of acetylation.

The distribution of molecular weight (Mw/Mn) is 1.3 to 1.65, particularly 1.4 to 1.65.

The weight-average molecular weight (Mw, $\times 10^4$) is 5 to 100, particularly 10 to 50.

The degree of acetylation is 59.0 to 62.5%, particularly 59 to 62% (e.g., 60 to 62%).

As mentioned above, since the cellulose acetate of the present invention has a high solubility in a solvent, even with a high degree of acetylation, the cellulose acetate content in the solution and the viscosity of the cellulose acetate solution can be selected according to the application. The solution viscosity of the cellulose acetate may be an index of its high speed moldability, particularly in a casting method and a spinning method. That is, since cellulose acetate having a low solution viscosity enables cast coating and spinning at high speeds and forms a smooth surface in a short time (that is, has a high leveling), even high speed molding results in a high moldability and improved production of a molded product. The solution viscosity of cellulose acetate can be selected from a range which does not impair its moldability at a high speed, for example, the viscosity of a 15% solution containing 13% by weight of cellulose acetate and 2% by weight of triphenyl phosphate is 20 to 70 seconds, preferably about 30 to 65 seconds, according to the falling ball viscosity method 1 described below.

Falling Ball Viscosity Method 1

A cellulose acetate, such as CTA, (42.7 parts by weight) with triphenyl phosphate (6.8 parts by weight, 16% by weight based on cellulose acetate) is dissolved in a mixed solvent, n-butanol/methanol/ dichloromethane=3/15/82 (weight ratio), 280.5 parts by weight, to prepare a solution of a cellulose acetate having 15% by weight of solids content, including triphenyl phosphate. This solution is injected in a glass tube (diameter, 2.53 cm; length, 31.9 cm; distance between two gage marks, 9.93 cm), then a steel ball (diameter, 3.20 mm; made of stainless steel; specific gravity, 7.87 g/cm$^3$ (23° C.)) is allowed to fall therein, and the time (sec.) required for the ball to fall a distance of 10 cm between two gage marks was determined as the viscosity.

Further, the cellulose acetate of the present invention is characterized by containing an acetone extract of not more than 5%, having a viscosity-average degree of polymerization (DP) of not less than 290 and a concentrated solution viscosity ($\eta$) for the viscosity-average degree of polymerization (DP) according to the falling ball viscosity method 2 expressed by the following formula (1):

$$2.814 \times ln(DP) - 11.753 \leq ln(\eta) \leq 7.28 \times ln(DP) - 37.059 \quad (1).$$

The above formula (1) in the present invention is obtained from experiments performed by the present inventors. For cellulose acetate having a viscosity-average degree of polymerization of not less than 290, the viscosity of the concentrated solution increases exponentially as the degree of polymerization increases, while the cellulose acetate of the present invention behaves in a different way. Thus, we calculated the formula (1) by plotting the viscosity-average degree of polymerization against the concentrated solution viscosity. It is particularly preferred to satisfy the following formula (2):

$$2.814 \times ln(DP) - 11.753 \leq ln(\eta) \leq 6.29 \times ln(DP) - 31.469 \quad (2).$$

The method for determination of the viscosity of a concentrated solution ($\eta$) according to the falling ball viscosity method 2 is as follows:

Falling Ball Viscosity Method 2

A cellulose acetate was dissolved in methylene chloride:methanol=8:2 (weight ratio) to obtain a solution having a cellulose acetate concentration of 15% by weight and the solution was filled in a viscosity tube with an inner diameter of 2.6 cm. After the temperature was adjusted to 25° C., a steel ball (diameter, 3.15 mm; 0.135 g) was allowed to fall through the solution and the time (sec.) required for the ball to fall for a distance of 10 cm between two gage marks was determined as the viscosity.

In the present invention, CTA obtained by an ordinary method is washed with ketones, acetate esters, cellosolves, or the like, to remove low molecular weight materials, inhibit crystallization and provide a material for a film having excellent physical properties.

The characteristics of the CTA obtained by this washing is that after the CTA obtained according to an ordinary method is washed once, the amount of the low molecular weight CTA existing in the washings is about 10 to 15%, whilst cellulose acetate after washing is reduced to not more than 5% upon rewashing and extraction. In other words, it is required to wash and extract the CTA so that the amount of the low molecular weight CTA after re-extraction should be no more than 5%.

The improved properties of, for example, the films are considered to be attributable to the removal of the low molecular weight materials in the product by washing, thereby preventing the formation of unnecessary crystals and resulting in increased non-crystal portions in the film, to afford flexibility and additional transparency to the film.

The cellulose acetate can be produced by an ordinary method, for example, the sulfuric acid catalyst method, the acetic acid method, the methylene chloride method and the like. The cellulose acetate is generally obtained from cellulose acetate after an activation treatment with acetic acid or the like by preparing cellulose triacetate with acetic anhydride using a sulfuric acid catalyst and adjusting the degree of acetylation by saponification (hydrolysis). The Mw/Mn of cellulose acetate obtained according to such a method is generally about 1.8 to 3.0.

According to the present method, the cellulose acetate is washed with a solvent to produce a cellulose acetate having a narrow molecular weight distribution. As these solvents, those which do not completely dissolve but swell or partially dissolve the cellulose acetate may be used. Solvents which swell or partially dissolve the cellulose acetate may be those capable of dissolving and eluting low molecular weight components, and the percentage of the component soluble in a solvent for the cellulose acetate is not particularly limited so long as the high molecular weight component can be separated. In order to remove the low molecular weight component of the cellulose acetate and efficiently obtain the high molecular weight component, it is preferable to use a solvent which dissolves 0.1 to 30% by weight, preferably 1 to 25% by weight, more preferably 5 to 15% by weight of the cellulose acetate when the cellulose acetate is dispersed at ambient temperature (25° C.) at a solids concentration of 5% by weight. The solvents capable of eluting the low molecular weight component are generally those which dissolve about 1 to 20% by weight of the cellulose acetate. When the component soluble in a solvent for the cellulose acetate is less than 0.1% by weight, the low molecular weight component cannot be eluted by repeated washing operations, and when it is more than 30% by weight, it is not economical and it is difficult to efficiently produce the cellulose acetate on an industrial scale.

This washing solvent can be selected depending on the type of cellulose acetate. For selection of the washing solvent, the solubility parameter $\delta$ can be referenced (for example, H. Burrell; Off. Dig., 29, 1069 (1957)). The solubility parameter $\delta$ may be obtained, as described, for example, in J. H. Hildebrand, R. L. Scott; "Solubility of Non-electrolytes" Chap. 20, Reinhold (1950), according to the following formula:

$$\delta = (E/V)^{0.5}$$

(wherein E represents molar heat of evaporation (cal) and V represents molecular volume (cc)).

washing solvents include, for example, ketones such as acetone (10.0, hereinafter the data of solubility parameter $\delta$ is simply given in parentheses), methyl ethyl ketone (9.3), diethyl ketone (8.8), methyl isobutyl ketone (8.4), diisopropyl ketone (8.0), diisobutyl ketone (7.8); ethers such as dibutyl ether (7.1), dioxane (9.9), tetrahydrofuran (10.2); organic acids such as formic acid, acetic acid, propionic acid, butyric acid, lactic acid; esters such as methyl acetate (9.6), ethyl acetate (9.1), isopropyl acetate (8.4), butyl acetate (8.5), amyl acetate (8.5), cellosolve acetate (8.7), methyl propionate, ethyl propionate, ethyl lactate; cellosolves such as methyl cellosolve (9.9), ethyl cellosolve, isopropyl cellosolve, propyl cellosolve, butyl cellosolve (8.9), methyl cellosolve acetate, cellosolve acetate; carbitols such as methyl carbitol, ethyl carbitol (9.6), propyl carbitol, butyl carbitol (8.9); halogenated hydrocarbons such as chloroform (9.3), dichloromethane (10.2), dichloroethane (9.5), carbon tetrachloride; nitro compounds such as nitromethane (12.7), nitroethane (11.1), nitropropane, aprotic polar solvents such as acetonitrile (11.9), N,N-dimethylformamide (12.1), N,N-diethylformamide (10.6), dimethylacetamide (10.8), diethylacetamide (9.9), dimethylsulfoxide; and a solvent mixture thereof.

In addition, in order to control the solubility of the cellulose acetate, the above solvents can be used as a solvent mixture with other solvents such as water, alcohols such as methanol (14.5), ethanol (12.7), n-propanol (11.9), isopropanol, n-butanol (11.4), isobutanol, diacetone alcohol, cyclohexanol (11.4); aliphatic hydrocarbons such as pentane (7.0), hexane (7.3), heptane (7.4), octane (7.2); alicyclic hydrocarbons such as cyclohexane (8.2), methyl cyclohexane (7.8); aromatic hydrocarbons such as benzene (9.2), toluene (8.9), xylene (8.8), ethyl benzene (8.8). Dichloromethane alone or a solvent mixture of dichloromethane and ethanol (9:1 by weight ratio) is a good solvent for cellulose acetate and have high solvating properties. For these good solvents, the solubility of the cellulose acetate can be controlled by altering the percentage of the components in the solvent mixture or by the addition of another solvent. Among the above solvents, water may be used with hydrophilic solvents, particularly a water-soluble solvent such as acetone, acetic acid, etc.

Preferred washing solvents include those having solubility parameters of 7 to 12.5, preferably 8 to 12 (e.g., 8.5 to 11.5), more preferably 9 to 11 (e.g., 9 to 10.5). For efficient elution of the low molecular weight components, at least one solvent selected from polar solvents other than halogenated hydrocarbon, for example, ketones, ethers, organic acids, esters, cellosolves and carbitols may be used. In particular, to enhance the elution efficiency of the low molecular weight components, for example, ketones such as acetone; ethers such as tetrahydrofuran; organic acids such as acetic acid and esters such as methyl acetate are preferred independently of the above mentioned solubility parameter. Particularly preferred solvents include those having a solubility parameter of 8.5 to 11.5 (preferably 9 to 11) and which are selected from ketones, ethers, organic acids and esters.

When the cellulose acetate is CDA and CTA, particularly CTA, which has a high degree of acetylation, the washing solvents are preferably ketones (e.g., acetone), esters (e.g., methyl acetate), organic acids having about 2 to 4 carbon atoms (e.g., acetic acid) and ethers (e.g., tetrahydrofuran).

When a solvent mixture containing poor solvents (e.g., water and/or alcohols) are used as a washing solvent, the greater the amount of the poor solvent, the more the elution efficiency of the low molecular weight components will be impaired. Accordingly, the ratio of the poor solvent to the low molecular weight components can be selected within the range wherein the low molecular weight components in the cellulose acetate can be eluted, and is, for example, not more than 40% by weight (e.g., 5 to 35% by weight), preferably not more than 30% by weight (e.g., 10 to 30% by weight) of the total amount of the washing solvent.

For the washing treatment of the cellulose acetate, the cellulose acetate may be in various forms, for example, powder, granules, fibers, flakes, etc. The washing treatment of cellulose acetate includes the ordinary methods, for example, a method wherein cellulose acetate is impregnated or dispersed in the above solvent, a method wherein cellulose acetate is wet or immersed with the above solvent, then a solvent is optionally added and the solvent is separated by, for example, centrifugation. The washing treatment may be optionally carried out with warming or heating, for example, at the temperature of from 30° C. to the boiling point of the solvent (for example, about 40 to 90° C.) to enhance the elution efficiency of the low molecular weight components. For washing, 1 to 50% by weight, preferably 3 to 30% by weight, more preferably about 5 to 20% by weight (e.g., 5 to 15% by weight) of cellulose acetate is generally washed out.

The amount of the above solvent used is not particularly limited, but selected from a wide range, for example, it is generally about 50 to 5,000 parts by weight, preferably 100 to 2,500 parts by weight based on 100 parts by weight of the cellulose acetate. The cellulose acetate subjected to the washing treatment with a solvent is generally separated by filtration, centrifugation or the like, and dried.

Using the thus obtained cellulose acetate as a material for molding enhances the productivity of the molded product without decreasing the average molecular weight, which has an effect on the strength of the molded product. The cellulose acetate of the present invention may be used in various forms depending on the types of the molding methods (for example, powder, pellets, etc.). However, it possesses a high solubility in a solvent as well as a low solution viscosity. Therefore, it is often used as a cellulose acetate solution (dope). Representative molding methods using a cellulose acetate solution include, for example, a process for production of a film or sheet (photographic film, etc.) by a casting method including a spinning method, a process for the production of fibers by spinning. Further, the cellulose acetate of the present invention, which has a low solution viscosity, can be utilized in other applications, for example, plastics, lacquer, electrical insulating material and the like. The cellulose acetate solution may be prepared using a good solvent, depending on the type of the cellulose acetate, and this good solvent is properly selected from the above solvents (for example, a halogenated hydrocarbon such as dichloromethane).

For molding, the cellulose acetate of the present invention can be used with another cellulose ester (for example, an ester of an organic acid such as cellulose propionate, cellulose butyrate; an ester of an inorganic acid such as cellulose nitrate, cellulose sulfate, cellulose phosphate and the like). In addition to the above solvents, to the cellulose acetate, optional additives may be added, for example, an ester type plasticizer (e.g., triacetin, triethylene glycol diacetate, triethylene glycol dipropionate, dibutyl phthalate, dimethoxyethyl phthalate, triethyl citrate ester, etc.), inorganic fine particles (e.g., kaolin, talc, diatomaceous earth, quartz, calcium carbonate, barium sulfate, titanium oxide, alumina, etc.), a thermostabilizer (e.g., a salt of alkaline earth metal such as calcium, magnesium, etc.), coloring agents, etc.

Since the cellulose acetate of the present invention has a narrow molecular weight distribution Mw/Mn and the low molecular weight components are removed, the solution viscosity can be reduced and the moldability can be improved without reducing the degree of polymerization. The cellulose acetate has a high solubility in a solvent and high moldability in spite of having a high average degree of polymerization and high average degree of substitution. Accordingly, it is useful to use a cellulose acetate solution with a low solution viscosity to obtain molded products having a high moisture resistance and dimensional accuracy by a molding process at a high processing speed.

According to the present method, a cellulose acetate having the excellent properties as described above can be produced by a simple operation like washing with a solvent.

BRIEF DESCRIPTION OF THE DRAWINGS

FIG. 1 is a graph showing the relationship between the weight-average molecular weight and the falling ball viscosity of the cellulose acetate obtained in Examples 1 to 4 and Comparative Examples 1 to 5.

EXAMPLES

The present invention will be illustrated in detail referring to the Examples and Comparative Examples. In the following Examples and Comparative Examples, the viscosity of the concentrated solution was determined according to the "falling ball viscosity method" described above. The molecular weight, molecular weight distribution, degree of acetylation, viscosity-average degree of polymerization, physical properties of the film and acetone extract were determined as follows:

(1) Molecular Weight and Molecular Weight Distribution

Measurement was carried out using a high speed liquid chromatography system "GPC-LALLS" having a gel filtration column connected to a detector for refractive index, light scattering. The measuring conditions are as follows:

Solvent: methylene chloride

Column: GMH×1 (manufactured by Toso)

Sample concentration: 0.1% (w/v)

Flow rate: 1 ml/min.

Sample injection: 300 µl

Standard sample: methyl polymethacrylate (Mw=188,200)

Temperature: 23° C.

(2) Degree of Acetylation (%)

The degree of acetylation can be determined by the saponification method. That is, a dried cellulose acetate, such as CTA, was precisely weighed, and dissolved in a solvent mixture of acetone and dimethylsulfoxide (4:1 by volume ratio), to which was added a given amount of 1N aqueous sodium hydroxide and saponification was carried out at 25° C. for 2 hours. Phenolphthalein was added as an indicator and an excess of sodium hydroxide was titrated with 1N sulfuric acid (concentration factor: F). In the same method as described above, a blank test was carried out. The degree of acetylation was calculated according to the following formula:

$$\text{Degree of acetylation } (\%) = (6.005 \times (B-A) \times F)/W$$

(wherein A is the volume (ml) of 1N sulfuric acid required for titration of the sample, B is the volume (ml) of 1N sulfuric acid required for titration of blank test, F is a concentration factor of 1N sulfuric acid, W is the weight of the sample).

(3) Method for Measuring and Calculating Viscosity-Average Degree of Polymerization (DP)

Oven-dried cellulose acetate (about 0.2 g, precisely weighed) was dissolved in a solution of methylene chloride: ethanol=9:1 (100 ml). The time (sec.) required for the solution to drop was measured by an Ostwald viscometer at 25° C. The degree of polymerization was obtained according to the following formula:

$$\eta_{rel} = T/T_0$$

$$[\eta] = (\ln \eta_{rel})/c$$

$$DP = [\eta]/km$$

T: time (sec.) required for the sample solution to drop $T_0$: time (sec.) required for the solvent alone to drop c: concentration (g/l)

km: $6 \times 10^{-4}$ (4) Process for Preparing Film

A film used for the measurement of mechanical strength was prepared by dissolving a given amount of cellulose acetate and a plasticizer in a solvent, which was then filtered and cast on a glass sheet so that the clearance and casting speed would be constant, followed by drying.

(5) Physical Properties of the Film

The physical properties of the film were measured as (i) tensile strength, (ii) bending strength, (iii) tearing strength, (iv) tensile elongation. Each evaluation method is shown below.

(i) Measurement of Tensile Strength

Film cut into 10 cm length (initial length of the sample, 5 cm) was stretched at a stretching speed of 20 mm/min according to ISO1184-1983, with the initial sample length being 5 cm, and the tensile strength was obtained from the load at the breaking point.

(ii) Measurement of Bending Strength

According to ISO8776-1988, the reciprocating number of bending required for the film (cut into 12 cm length) to be broken was determined.

(iii) Measurement of Tearing Strength

The load required for tearing was determined according to ISO6383/2-1983 using film cut into 5×6.4 cm pieces.

(iv) Measurement of Tensile Elongation

The tensile elongation was determined from the elongation of the film at the breaking point, by stretching the film cut into 10 cm length (initial length, 5 cm; 20 mm/min) according to ISO1184-1983.

(6) Determination of Acetone Extract

The extraction of cellulose acetate (2 g) was carried out for 8 hours using a Soxhlet extractor and acetone as a solvent. The extract residue was oven-dried, and weighed to calculate the acetone extract.

Examples 1 to 4

Cellulose (100 parts by weight, with a moisture content of 5%) was activated by pretreatment with acetic acid (36 parts by weight), then esterified using sulfuric acid (7.8 parts by weight), acetic anhydride (260 parts by weight) and acetic acid (400 parts by weight) at 36° C. for 120 minutes. After neutralization with magnesium acetate, CTA was obtained by saponification and aging at 63° C. for 30 minutes.

The obtained CTA was divided into four equal pieces, and to each piece was added ten times by weight of methyl acetate (Example 1), acetone (Example 2), tetrahydrofuran (Example 3), and 80% aqueous acetic acid (Example 4), which were then stirred at room temperature for 120 minutes, filtered and dried to obtain purified CTA. The amount of CTA washed out was 25% by weight for methyl acetate (Example 1), 15% by weight for acetone (Example 2), 8% by weight for tetrahydrofuran (Example 3) and 12% by weight for aqueous acetic acid (Example 4).

Comparative Examples 1 to 4

According to an ordinary method altering esterification and saponification conditions, cellulose acetates having four different molecular weights were prepared. That is, cellulose (100 parts by weight, with a moisture content of 5%) was activated by pretreatment with acetic acid (36 parts by weight), then esterified using sulfuric acid (7.8 parts by weight), acetic anhydride (260 parts by weight) and acetic acid (400 parts by weight) at 36 to 40° C. for 100 to 110 minutes, neutralized with magnesium acetate, then saponified and matured at 60 to 63° C. for 20 to 40 minutes, to prepare four samples of cellulose acetate.

Comparative Example 5

CTA obtained in Example 1 was washed using a poor solvent for low molecular weight components. That is, using 10 times by weight of aqueous acetic acid solution (acetic acid/water=5/5 (by weight ratio)) based on the CTA obtained in Example 1, a washing treatment was carried out in the same manner as described in Example 1, followed by filtration and drying, providing the cellulose acetate.

The degree of acetylation, molecular weight (Mn, Mw), molecular weight distribution and viscosity of the concentrated solution (falling ball viscosity method 1) of the cellulose acetate obtained in the above Examples and Comparative Examples are given in Table 1, and the acetone extract, viscosity-average degree of polymerization (DP), relation between the viscosity-average degree of polymerization and the viscosity of the concentrated solution (falling ball viscosity method 2), and properties of the film are given in Table 2. The relation between the weight-average molecular weight and the viscosity (falling ball viscosity measurement 1) are shown in FIG. 1.

TABLE 1

|  | Mn × 10⁴ | Mw × 10⁴ | Mw/Mn | Acetylation Degree (%) | Viscosity of Conc. solution (sec) |
| --- | --- | --- | --- | --- | --- |
| Example 1 | 14.2 | 21.5 | 1.51 | 60.5 | 56.1 |
| Example 2 | 13.0 | 20.8 | 1.60 | 60.9 | 55.2 |
| Example 3 | 12.5 | 19.7 | 1.58 | 61.0 | 50.9 |
| Example 4 | 13.6 | 20.6 | 1.52 | 60.9 | 62.3 |
| Com. Ex. 1 | 9.9 | 19.5 | 2.13 | 61.1 | 58.2 |
| Com. Ex. 2 | 9.1 | 20.0 | 2.02 | 60.8 | 77.3 |
| Com. Ex. 3 | 8.9 | 19.9 | 2.24 | 61.0 | 75.5 |
| Com. Ex. 4 | 10.5 | 21.2 | 2.36 | 60.9 | 99.7 |
| Com. Ex. 5 | 8.7 | 18.7 | 2.16 | 60.9 | 45.5 |

Example 5

Cellulose acetate obtained by an ordinary method (degree of acetylation, 60.9%; viscosity-average degree of polymerization, 299) was stirred in acetone (10 times by weight) at room temperature for 30 minutes, drained and dried to obtain a cellulose acetate (component soluble in acetone, 0.4%). The properties were as follows: average degree of acetylation, 60.9%; viscosity-average degree of polymerization, 322; molecular weight distribution, 1.59. On the other hand, the component extracted and removed in acetone was 12% by weight based on the weight of the starting material, the properties of which were as follows: degree of acetylation, 60.9%, viscosity-average degree of polymerization, 196. The film properties of the resulting sample without a low degree of polymerization material are given in Table 3. The relation between the viscosity-average degree of polymerization and the falling ball viscosity of the concentrated solution of this sample was expressed as follows: $\ln(\eta)=4.66$, i.e., $4.50<\ln(\eta)<4.85<4.98$, which satisfied formulae (1) and (2).

Comparative Example 6

The cellulose acetate synthesized in Example 1 before washing with acetone (acetone soluble matter, 12%) was used. The relation between the viscosity-average degree of polymerization and the falling ball viscosity of the concentrated solution was as follows: $\ln(\eta)=4.31$, i.e., $4.29<\ln(\eta)<4.39<4.44$, which satisfied formulae (1) and (2). The molecular weight distribution was 2.20. The film properties are given in Table 1.

Comparative Example 7

Cellulose acetate having an average degree of acetylation of 60.8 and a viscosity average degree of polymerization of 314 was obtained according to an ordinary method. This sample contained 13% of acetone soluble matter. The relation between the viscosity average degree of polymerization and the falling ball viscosity of concentrated solution was as follows: $\ln(\eta)=4.74$, i.e., $4.43<4.69<\ln(\eta)<4.80$, which did not satisfy formula (2) but did satisfy formula (1). The molecular weight distribution was 2.07. The film properties are given in Table 1.

TABLE 2

|  | Acetone Extract (%) | Viscosity-average Degree of polymerization (DP) | Relation Between Degree of polymerization and Falling Ball Viscosity | | | Physical Properties (MD/TD) | | | |
| --- | --- | --- | --- | --- | --- | --- | --- | --- | --- |
|  |  |  | Lower Limit | ln(η) | Upper Limit (2) | Lower Limit (1) | Tensile Strength (kg/mm²) | Bending Strength | Tearing Strength (gf) | Tensile Elongation (%) |
| Example 1 | 0.2 | 343 | 4.67 | 4.67 | 5.25 | 5.44 | 13.0/10.2 | 140/120 | 26/26 | 53/40 |
| Example 2 | 0.4 | 332 | 4.58 | 4.66 | 5.05 | 5.20 | 12.7/12.6 | 120/150 | 25/24 | 48/53 |
| Example 3 | 1.0 | 314 | 4.43 | 4.58 | 4.69 | 4.80 | 12.5/12.3 | 130/140 | 24/24 | 48/45 |
| Example 4 | 0.3 | 329 | 4.56 | 4.78 | 4.99 | 5.14 | 12.8/12.0 | 140/130 | 25/23 | 50/48 |
| Com. Ex. 1 | 11 | 314 | 4.43 | 4.71 | 4.69 | 4.80 | 10.9/11.0 | 110/105 | 20/21 | 44/45 |
| Com. Ex. 2 | 13 | 318 | 4.46 | 4.99 | 4.77 | 4.89 | 11.8/10.5 | 120/100 | 22/21 | 46/40 |
| Com. Ex. 3 | 12 | 318 | 4.46 | 4.97 | 4.77 | 4.89 | 12.0/12.1 | 115/120 | 20/20 | 47/44 |
| Com. Ex. 4 | 10 | 335 | 5.61 | 5.25 | 5.10 | 5.27 | 12.3/11.8 | 100/104 | 19/20 | 47/47 |
| Com. Ex. 5 | 17 | 298 | 4.28 | 4.46 | 4.37 | 4.42 | 11.0/11.3 | 125/123 | 17/17 | 42.41 |

*MD: Direction of casting the film
TD: Direction perpendicular to that of casting the film As is obvious from Tables 1 and 2 and FIG. 1, the cellulose acetate obtained in the Examples had a lower solution viscosity compared with the cellulose acetate of Comparative Example having the same molecular weight.

Comparative Example 8

Cellulose acetate having an average degree of acetylation of 61.7 and a viscosity average degree of polymerization of 291 was obtained according to an ordinary method. This sample contained 12% of acetone soluble matter. The relation between the viscosity average degree of polymerization and the falling ball viscosity of the concentrated solution was as follows: $ln(\eta)=4.68$, i.e., $4.21<4.22<4.24<ln(\eta)$, which did not satisfy formulae (1) and (2). The molecular weight distribution was 2.11. The film properties are given in Table 3.

TABLE 3

|  | Example 5 | Com.Ex. 6 | Com.Ex. 7 | Com.Ex. 8 |
|---|---|---|---|---|
| General Properties | | | | |
| Average degree of acetylation (%) | 60.9 | 60.9 | 60.8 | 61.7 |
| Viscosity average degree of polymerization | 322 | 299 | 314 | 291 |
| Physical Properties (MD/TD) | | | | |
| Tensile Strength (kg/mm$^2$) | 11.8/11.8 | 12.0/11.5 | 12.2/12.2 | 10.9/11.3 |
| Bending Strength (time) | 130/160 | 120/130 | 140/110 | 110/110 |
| Tearing Strength (gf) | 25/24 | 22/23 | 22/23 | 16/17 |
| Tensile Elongation (%) | 51/47 | 43/45 | 47/40 | 41/42 |

*MD: Direction of casting the film
TD: Direction perpendicular to that of casting the film

What is claimed is:

1. Cellulose acetate with high moldability having molecular weight distribution Mw/Mn of 1 to 1.7 according to gel permeation chromatography.

2. Cellulose acetate according to claim 1, which has average degree of acetylation of 52 to 62.5% and molecular weight distribution Mw/Mn of 1.2 to 1.7.

3. Cellulose acetate according to claim 1, which has average degree of acetylation of 59.0 to 62.5% and molecular weight distribution Mw/Mn of 1.4 to 1.65.

4. Cellulose acetate according to claim 1, wherein acetone extract is not more than 5%, viscosity average degree of polymerization (DP) is not less than 290, viscosity of the concentrated solution ($\eta$) for viscosity average degree of polymerization (DP) according to falling ball test is expressed by the following formula (1):

$$2.814 \times ln(DP) - 11.753 \leq ln(\eta) \leq 7.28 \times ln(DP) - 37.059 \qquad (1).$$

5. Cellulose acetate according to claim 4, wherein viscosity of the concentrated solution ($\eta$) for viscosity average degree of polymerization (DP) according to falling ball test is expressed by the following formula (2):

$$2.814 \times ln(DP) - 11.753 \leq ln(\eta) \leq 6.29 \times ln(DP) - 31.469 \qquad (2).$$

6. Cellulose acetate according to claim 4, wherein viscosity-average degree of polymerization (DP) is 290 to 400.

7. The cellulose acetate acording to claim 5, wherein the viscosity-average degree of polymerization (DP) is 290 to 400.

* * * * *

UNITED STATES PATENT AND TRADEMARK OFFICE
CERTIFICATE OF CORRECTION

PATENT NO : 5 962 677
DATED : October 5, 1999
INVENTOR(S) : Ko MURAKAMI et al.

It is certified that error appears in the above-identified patent and that said Letters Patent are hereby corrected as shown below:

```
Column 14; line  8,  after "wherein" insert ---an---.
           line  9,  after "5%," insert ---the---.
           line 10,  after "290," insert ---and the---.
           line 12,  after "to" insert ---the---.
           line 18,  after "wherein" insert ---the---.
           line 19,  after "for" insert ---the---.
           line 20,  after "to" insert ---the---.
           line 26,  after "wherein" insert ---the---.
```

Signed and Sealed this

Tenth Day of April, 2001

Attest:

NICHOLAS P. GODICI

Attesting Officer

Acting Director of the United States Patent and Trademark Office